US009011143B2

United States Patent
Piringer

(10) Patent No.: US 9,011,143 B2
(45) Date of Patent: Apr. 21, 2015

(54) PARALLEL FLOW REGENERATIVE LIME KILN AND METHOD FOR THE OPERATION THEREOF

(75) Inventor: Hannes Piringer, Beinwill am See (CH)

(73) Assignee: Maerz Ofenbau AG (CH)

( * ) Notice: Subject to any disclaimer, the term of this patent is extended or adjusted under 35 U.S.C. 154(b) by 452 days.

(21) Appl. No.: 13/501,341

(22) PCT Filed: Sep. 15, 2010

(86) PCT No.: PCT/EP2010/063559
§ 371 (c)(1),
(2), (4) Date: Apr. 11, 2012

(87) PCT Pub. No.: WO2011/072894
PCT Pub. Date: Jun. 23, 2011

(65) Prior Publication Data
US 2012/0244484 A1 Sep. 27, 2012

(30) Foreign Application Priority Data
Dec. 15, 2009 (DE) .......................... 10 2009 058 304

(51) Int. Cl.
*F27D 1/12* (2006.01)
*F27B 1/02* (2006.01)
(Continued)

(52) U.S. Cl.
CPC ... *F27B 1/02* (2013.01); *C04B 2/12* (2013.01);
*F27B 1/26* (2013.01); *F27D 19/00* (2013.01);
*F27D 21/0014* (2013.01)

(58) Field of Classification Search
CPC .............. F27B 1/005; F27B 1/16; F27B 1/08;
C01B 31/088; C04B 2/12; F23G 7/068;
C03B 5/235; C03B 5/237; F23L 15/02;
F27D 17/008

USPC .......... 432/17, 19, 95, 96, 99, 101, 179, 181, 432/182
See application file for complete search history.

(56) References Cited

U.S. PATENT DOCUMENTS 4,289,482 A * 9/1981 Fussl ............................... 432/96
4,382,779 A * 5/1983 Fussl ............................... 432/25
(Continued)

FOREIGN PATENT DOCUMENTS

CA 1124513 6/1982

OTHER PUBLICATIONS

Ruch H.: "Measurement and Control Engineering at 1-13 lime burning" Cement Lime Plaster, vol. 1973, No. 6, Jun. 1973, pp. 257-263, XP002608932; Relevant Portion at p. 260, paragraph 4.1, Figure 5.

*Primary Examiner* — Gregory A Wilson
(74) *Attorney, Agent, or Firm* — Renner Kenner Grieve Bobak Taylor & Weber

(57) ABSTRACT

The method according to the invention for operating a PFR lime kiln having at least two shafts, which each have a preheating zone, a combustion zone and a cooling zone, and an overflow channel which connects the two shafts, substantially comprises the following method steps:
  the two shafts are operated alternately as a combustion shaft and exhaust gas shaft,
  combustion air and fuel are supplied to the combustion shaft, a corresponding flame length being formed, and
  the hot gases which are produced in the combustion shaft reach the exhaust gas shaft via the overflow channel,
  at least one parameter of the hot gases which is characteristic of the formation of the flame length being established by means of direct or indirect measurement in the region of the overflow channel and the ratio of fuel to combustion air being adjusted in accordance with this parameter in order to adjust a predetermined flame length.

11 Claims, 4 Drawing Sheets

(51) Int. Cl.
 *C04B 2/12* (2006.01)
 *F27B 1/26* (2006.01)
 *F27D 19/00* (2006.01)
 *F27D 21/00* (2006.01)

(56) References Cited

U.S. PATENT DOCUMENTS

| | | | |
|---|---|---|---|
| 4,534,731 A * | 8/1985 | Fussl et al. | 432/14 |
| 5,460,517 A * | 10/1995 | Scheibenreif et al. | 432/95 |
| 6,027,333 A * | 2/2000 | Fujii et al. | 431/215 |
| 6,109,914 A * | 8/2000 | Matsuo | 432/180 |
| 6,113,387 A * | 9/2000 | Wilson et al. | 432/99 |
| 6,453,831 B1 * | 9/2002 | Zeisel | 110/347 |
| 6,461,154 B2 * | 10/2002 | Piringer et al. | 432/19 |
| 7,384,263 B2 * | 6/2008 | Piringer | 432/101 |
| 8,673,247 B2 * | 3/2014 | Thibeaumont et al. | 423/175 |
| 2001/0029005 A1 * | 10/2001 | Piringer et al. | 432/19 |
| 2011/0229387 A1 * | 9/2011 | Thibeaumont et al. | 423/175 |

* cited by examiner

PARALLEL FLOW REGENERATIVE LIME KILN AND METHOD FOR THE OPERATION THEREOF

FIELD OF THE INVENTION

The invention relates to a parallel flow regenerative lime kiln (PFR lime kiln) and method for the operation thereof.

BACKGROUND OF THE INVENTION

PFR lime kilns are used for burning limestone and comprise according to FIG. 1 at least two shafts 1, 2 which each have a preheating zone V, a combustion zone B and a cooling zone K. Both shafts are connected to each other by means of an overflow channel 3. The material to be burnt is introduced from above into both shafts and removed at the bottom as burnt material.

Both shafts are operated alternately as a combustion shaft and an exhaust gas shaft, combustion air being supplied to the combustion shaft in direct current with the material and fuel and the resultant hot exhaust gases being directed into the exhaust gas shaft via the overflow channel together with the heated cooling air which is supplied from below, where the exhaust gases are directed away upwards in counter-current to the material and preheat the material. After a predetermined period of time, for example, of 15 minutes, the function of the two shafts is interchanged, that is to say, the combustion shaft becomes the exhaust gas shaft and vice versa. This method allows very efficient burning of the limestone in direct current with the combustion gases and a regenerative preheating of the limestone in counter-current to the hot exhaust gases.

Owing to various disturbance variables, such as, for example, fluctuations in the calorific value of the fuel, fluctuations in the carbonate content of the raw material or fluctuations of the heat losses of the kiln, a readjustment of the quantity of fuel may be required. Another disturbance variable is formed by kerogen components which are often contained in the limestone which is to be burnt. This is an organic polymer material which releases hydrocarbons during heating. However, these kerogens are not distributed in a homogeneous manner in the raw material so that readjustment of the specific heat supply of the lime kiln of up to 6% is required in order to achieve a constant product quality.

SUMMARY OF THE INVENTION

The product quality is determined firstly by the residual $CO_2$ content of the burnt lime and the reactivity thereof. Both parameters should correspond to the predetermined desired values in the most constant manner possible. However, these two properties of the lime could previously be verified only at the end product so that a subsequent adjustment operation could be carried out only with a delay of from 12 to 16 hours (passage time of the material).

Although the kiln operator has previously influenced the product quality by measuring the temperature in the region of the overflow channel and a resultant manual adjustment of the heat supply, this type of adjustment requires a high degree of experience and nonetheless does not always lead to satisfactory results.

A parallel flow regenerative kiln is known, for example, from DE 29 27 834 A1. The measurement and adjustment technique of such a kiln is further described by H. Ruch: "Mess- and Regelungstechnik beim Kalkbrennen" (Measurement and Adjustment Techniques in Lime Burning) in Cement/Lime/Gypsum, Edition 6/1973, Pages 257-263.

An object of the invention is therefore to provide a method for operating a PFR lime kiln and a PFR lime kiln in order to ensure a high product quality of the burnt lime with a high level of reliability.

According to the invention, this object is achieved by the features of claim 1.

The method according to the invention for operating a PFR lime kiln having at least two shafts, which each have a preheating zone, a combustion zone and a cooling zone, and an overflow channel which connects the two shafts, substantially comprises the following method steps:

the two shafts are operated alternately as a combustion shaft and exhaust gas shaft, combustion air and fuel are supplied to the combustion shaft, a corresponding flame length being formed, and the hot gases which are produced in the combustion shaft reach the exhaust gas shaft via the overflow channel, at least one parameter of the hot gases which is characteristic of the formation of the flame length being established by means of direct or indirect measurement in the region of the overflow channel and the ratio of fuel to combustion air being adjusted in accordance with this parameter in order to adjust a predetermined flame length.

The PFR lime kiln according to the invention substantially comprises:

at least two shafts which each have a preheating zone, a combustion zone and a cooling zone, the two shafts being operated alternately as a combustion shaft and exhaust gas shaft, at least one fuel supply device associated with each shaft, at least one combustion air supply device associated with each shaft, an overflow channel which connects the two shafts, a measurement device which is arranged in the region of the overflow channel for establishing at least one parameter of the hot gases in the overflow channel and a control device which is connected to the fuel supply device, the combustion air supply device and the measurement device and which is constructed for adjusting the flame length in accordance with the method according to one or more of the preceding claims.

The invention is based on the knowledge that the reactivity of the burnt lime can be kept as constant as possible when the length of the flame which is formed in the combustion zone varies to the smallest possible extent, that is to say, is also kept as constant as possible. FIG. 1 illustrates the normal flame length 1 in which the flames are formed as far as the lower end of the combustion zone B and do not extend into the overflow channel. In this operating method, the thermal energy is ideally distributed over the entire length of the combustion zone of the combustion shaft. In this operating method, the excess of air is correctly adjusted. An excessively short flame length $l_1$, as set out in FIG. 2, leads to high combustion temperatures in the upper region of the combustion zone B and to product quality with little reactivity. In this operating method, the excess of air is higher than in FIG. 1. If the excess of air is too small, the flames penetrate through the overflow channel (FIG. 3).

The flame length consequently has a direct influence on the reactivity of the burnt lime. Owing to continuous measurement in the region of the overflow channel and a parameter of the hot gases which is established using this measurement and which is characteristic of the flame length, an adjustment operation can be carried out significantly earlier than before in order to keep the reactivity of the end product as constant as possible. Previously subsequent measurement was always necessary, with the result that the kiln was thereby potentially operated for from 12 to 16 hours at an incorrect setting.

The dependent claims relate to other configurations of the invention.

The parameter of the hot gases characteristic of the flame length may be produced, for example, by means of a temperature measurement, an $NO_x$ measurement and/or a CO measurement.

If the parameter is established by means of a temperature measurement in the region of the overflow channel, it is particularly possible to use the mean temperature of the hot gases in the overflow channel taking into account the minimum temperatures of the hot gases in the overflow channel.

According to a preferred method for adjusting the flame length in the combustion shaft, the following method steps are carried out:

a. establishing the mean value of the temperature of the hot gases in the overflow channel,
b. establishing the mean value of the minimum temperatures of the hot gases in the overflow channel,
c. calculating the difference ($\Delta T$) of the two mean values,
d. comparing the difference with an adjustable desired value and adjusting the quantity of combustion air to be supplied in accordance with the comparison result.

When establishing the mean value of the temperature of the hot gases in the overflow channel, an adjustable period of time at the beginning and at the end of each combustion time involved in the establishment is advantageously not taken into consideration since these portions often have irregularities and can falsify the result.

Furthermore, the establishment of the mean value of the minimum temperature of the hot gases in the overflow channel and the establishment of the mean value of the temperature of the hot gases can be carried out by means of an adjustable number of kiln cycles. In order to reduce variations in the measured values, it is further advantageous for the sliding average to be established in the method steps a) and/or b).

According to the method step d), the quantity of combustion air to be supplied is increased when the established difference is too great with respect to the adjustable desired value and decreased when the established difference is too small with respect to the adjustable desired value.

According to another variant of the method, the quantity of fuel to be supplied is increased when the temperature of the hot gases in the overflow channel is too low and reduced accordingly when the temperature of the hot gases is too high.

For the mean temperature of the hot gases in the overflow channel, there is predetermined a desired value which is advantageously adjusted in accordance with the throughput of the kiln and/or the grain size of the material to be burnt. This desired value is then used for the adjustment of the quantity of fuel and/or the adjustment of the quantity of combustion air.

BRIEF DESCRIPTION OF THE DRAWINGS

Other advantages and configurations of the invention are explained in greater detail below with reference to the description and the drawings, in which.

DETAILED DESCRIPTION OF THE INVENTION

Figure 1:
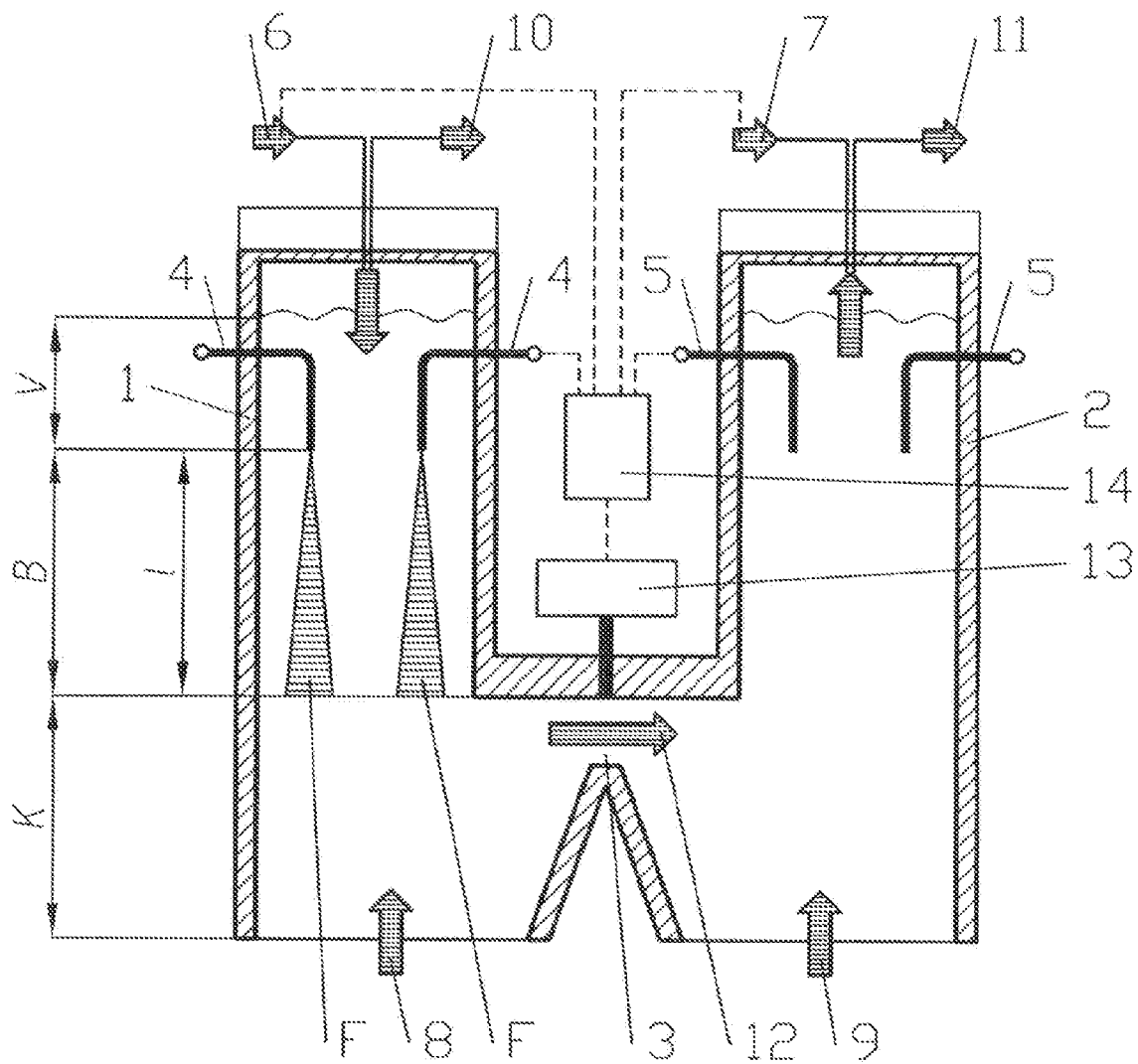
FIG. 1 is a schematic illustration of the PFR lime kiln with an optimum flame length being formed during operation.
Figure 2:
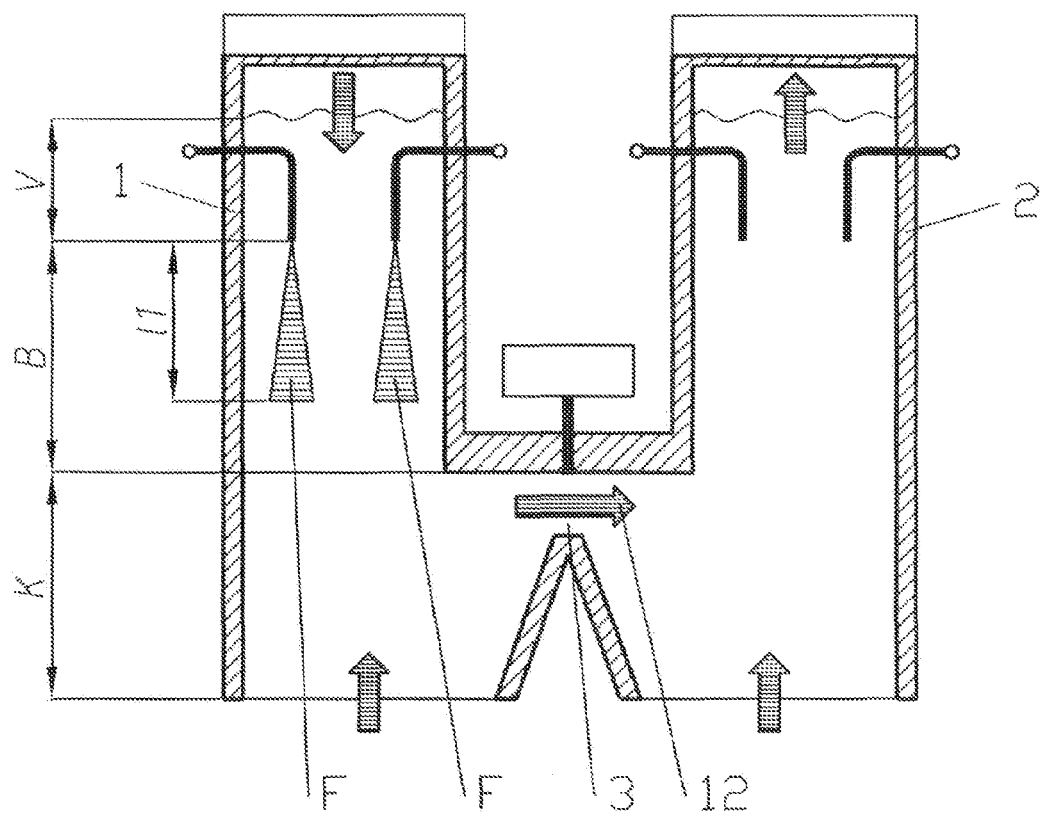
FIG. 2 is a schematic illustration of the PFR lime kiln with an excessively short flame length.
Figure 3:
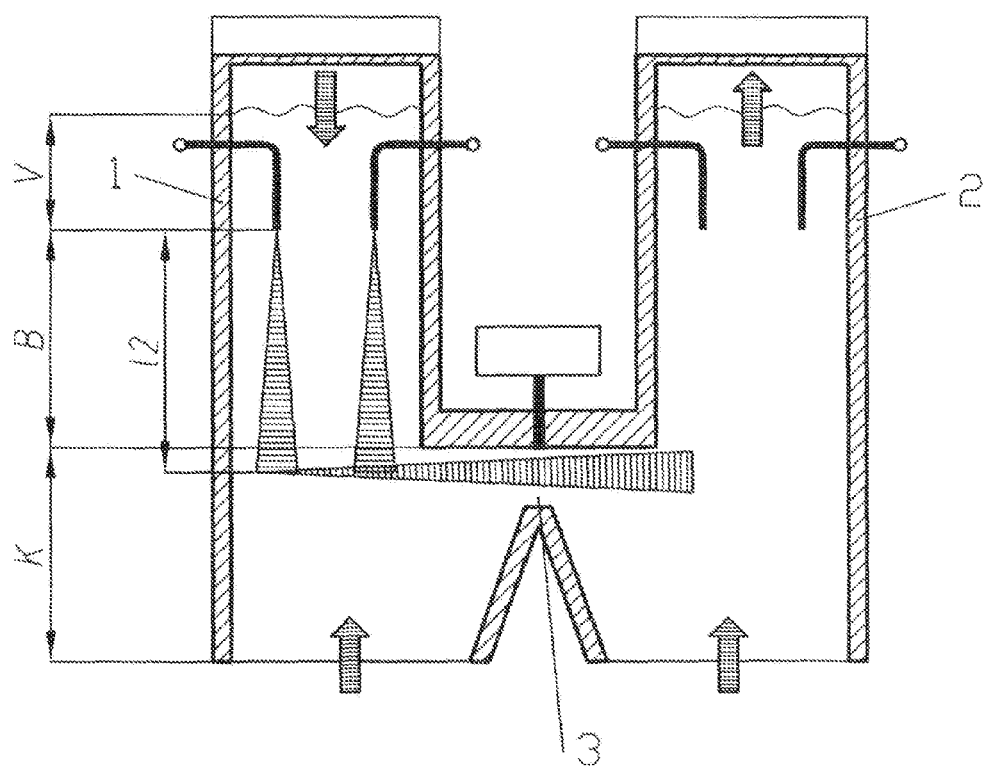
FIG. 3 is a schematic illustration of the PFR kiln with an excessively long flame length.

The two shafts 1, 2 of the lime shaft kiln illustrated in FIG. 1 to FIG. 3 each have fuel supply devices 4, 5 and combustion air supply devices 6, 7. In addition to the two combustion air supply devices 6, 7, exhaust gas discharge devices 10, 11 are further provided in the upper region. The fuel supply devices 4, 5 are formed, for example, by means of lances which open in the transition region between preheating zone V and combustion zone B in the material bed. Furthermore, the cooling zone K is supplied with cooling air from below by means of cooling air supply devices 8, 9.

During operation, the lime to be burnt is supplied to the two shafts 1, 2 from above by means of supply means which are not illustrated in greater detail, whilst the completely burnt and cooled material is removed at the lower end of the two shafts so that the material continuously moves in a downward direction. The passage time is generally from 12 to 14 hours. During the processing time, the two shafts 1, 2 are always operated alternately as a combustion shaft and exhaust gas shaft. In the illustrated embodiment according to FIGS. 1 to 3, the shaft 1 is illustrated in each case as a combustion shaft. To this end, combustion air and fuel are supplied via the combustion air supply device 6 or via the fuel supply device 4 so that one or more flames F are formed in the combustion zone B.

For an optimal use of the supplied thermal energy, the flame length l corresponds to the length of the combustion zone B. That is to say, the flames extend precisely as far as the lower end of the region provided as the combustion zone B. The hot exhaust gases produced during the combustion and the cooling air which is supplied from below and which is heated in the cooling zone K are directed away as hot gases 12 via the overflow channel 3 into the shaft 2 which acts as an exhaust gas shaft. At this time, neither combustion air nor fuel is supplied to the shaft 2. In this manner, the hot exhaust gases are able to flow through the material in the shaft 2 in countercurrent and are discharged via the discharge device 11.

After an adjustable period of time of, for example, 15 minutes, the supply of combustion air and fuel in the shaft 1 is switched off and the exhaust gas discharge device 10 is opened. At the same time, the combustion in the shaft 2 is started by fuel being supplied via the fuel supply device 5 and combustion air being supplied via the combustion air supply device 7. The hot gases which are then produced are subsequently discharged in the opposite direction via the shaft 1.

In the region of the overflow channel 3 there is further provided a measurement device 13 which can be constructed in particular to measure the $NO_x$ content or the CO content of the hot gases 12. However, it is preferably a temperature measurement device for directly or indirectly measuring the temperature of the hot gases 12. It is possible to use, for example, thermal elements which are located in the flow of the hot gases 12 or which are arranged in the region of the brick lining of the overflow channel 3. However, it is particularly appropriate to use an optical pyrometer by means of which the temperature of the hot gases is measured indirectly via the measurement of the heat radiation of the brick lining in the overflow channel. Even in the case of a flame flashover according to FIG. 3, a sudden very characteristic peak can be determined owing to the colour of the flame on the measurement device, and can be associated with the undesirable situation clearly and in particular immediately.

The measurement device 13 is connected to a control device 14 which in turn is connected to the fuel supply devices 4, 5 and the combustion air supply devices 6, 7 and which is used to adjust the ratio of fuel to combustion air in accordance with the measurement value established by the measurement device.

It is generally known that the reactivity of the burnt lime is linked directly to the length of the flames F formed in the combustion zone B. The reactivity of the burnt lime is in the predetermined desired range (desired value) when the flames extend as far as the lower edge of the combustion zone B, as illustrated in FIG. 1. In FIGS. 2 and 3, the operating situation of the lime kiln illustrated in FIG. 1 is illustrated with an excessively short flame (flame length $l_1$ in FIG. 1) and with an excessively large flame length (flame length $l_2$ in FIG. 3).

A change of the flame length occurs, for example, when the ratio of fuel to combustion air changes. Such a change can already be produced simply by the kerogen components of the lime which are released at irregular times, whereby undesirable fluctuations in the reactivity of the end product are produced.

Since the change of the ratio of fuel to combustion air has an effect on the flame length and consequently also indirectly on the reactivity of the end product, it is proposed according to the invention to establish a parameter of the hot gases by means of the earliest possible measurement, which parameter is characteristic of the flame length being formed. Although a $NO_x$ or CO measurement can in principle be taken into consideration for this, the adjustment owing to a temperature measurement has the decisive advantage that no additional measurement devices are required since a temperature measurement is required in any case.

Figure 4:
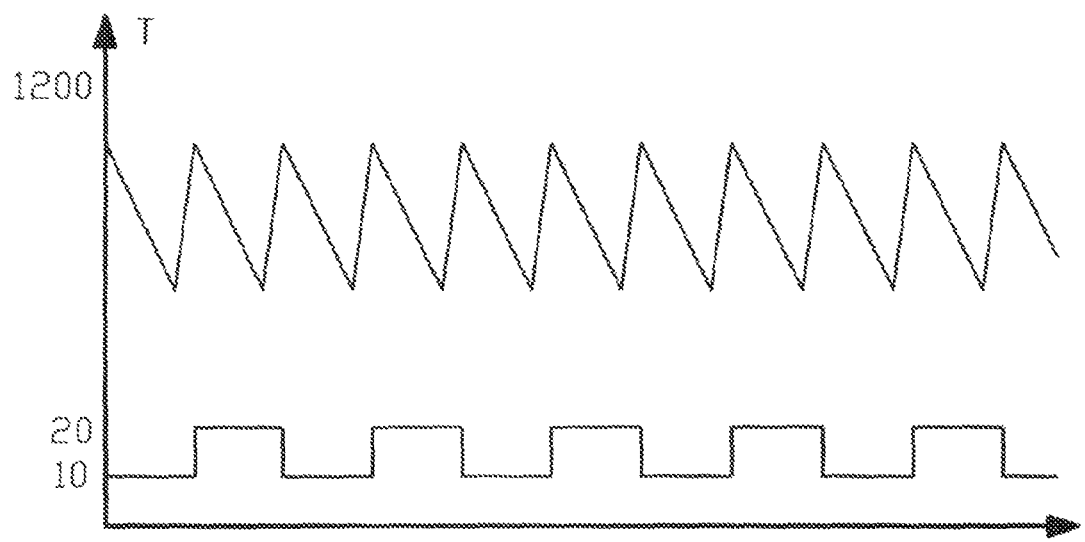
FIG. 4 is an illustration of the temperature path in the region of the overflow channel.

FIG. 4 illustrates the temperature path (upper line) measured by the measurement device 13. The lower line indicates which of the two shafts 1 or 2 burns at a specific time. At 10, the shaft 1 burns and at 20 the shaft 2. In the illustrated example, a sharp temperature increase is followed in every period by a slow decrease. However, the temperature path may be very different and also very irregular from kiln to kiln.

In the tests which form the basis of the invention, it has been found that the mean temperature of the hot gases in the overflow channel, taking into account the minimum temperatures of the hot gases in the overflow channel, can be used to establish a parameter which is directly linked to the flame length which is formed.

The parameter is formed by the difference of the mean of the temperature of the hot gases in the overflow channel and the mean of the minimum temperatures of the hot gases in the overflow channel. This temperature difference $\Delta T$ is then compared with an adjustable desired value or desired range and used to adjust the combustion air to be supplied. The quantity of combustion air is increased when the established difference is excessively large with respect to the adjustable desired value/range and decreased when it is too small.

When establishing the mean of the temperature of the hot gases in the overflow channel, a plurality of combustion cycles are advantageously taken into account, an adjustable period of time at the beginning and at the end of each combustion time involved in the establishment operation not being taken into account in each combustion cycle. In this manner, the result is not falsified by temperatures during the switching phase of the two shafts.

According to another adjustment, the quantity of the fuel to be supplied is adjusted in accordance with the temperature of the hot gases in the overflow channel, in particular regardless of the mean temperature.

The desired value for the established parameter and/or the mean temperature of the hot gases in the overflow channel are advantageously intended to be adapted to the throughput of the kiln and/or the grain size of the material to be burnt.

Owing to an appropriate selection of the adjustment step and the provision of the number of burning cycles after which an adjustment step is intended to be carried out, the lime kiln can be automatically controlled, an extremely consistent reactivity and a constant residual $CO_2$ content of the end product being achieved. The subsequent determination of the properties, such as reactivity or residual $CO_2$ content, are then used only for verification.

The invention claimed is:

1. Method for operating a parallel flow regenerative lime kiln having at least two shafts, which each have a preheating zone, a combustion zone and a cooling zone, and an overflow channel which connects the two shafts, having the following method steps:
   the two shafts are operated alternately as a combustion shaft and exhaust gas shaft,
   combustion air and fuel are supplied to the combustion shaft, a corresponding flame length being formed, and
   the hot gases which are produced in the combustion shaft reach the exhaust gas shaft via the overflow channel,
   characterised in that at least one parameter of the hot gases which is characteristic of the formation of the flame length is established by means of direct or indirect measurement in the region of the overflow channel and the ratio of fuel to combustion air is adjusted in accordance with this parameter in order to adjust a predetermined flame length, characterised in that, in order to adjust the flame length in the combustion shaft, the following method steps are carried out:
   a. establishing the mean value of the temperature of the hot gases in the overflow channel,
   b. establishing the mean value of the minimum temperatures of the hot gases in the overflow channel,
   c. calculating the difference ($\Delta T$) of the two mean values,
   d. comparing the difference with an adjustable desired value and adjusting the quantity of combustion air to be supplied in accordance with the comparison result.

2. Method according to claim 1, characterised in that the parameter is established by means of a temperature measurement in the region of the overflow channel.

3. Method according to claim 1, characterised in that the parameter is established from the mean temperature of the hot gases in the overflow channel taking into consideration the minimum temperatures of the hot gases in the overflow channel.

4. Method according to claim 1, characterised in that the parameter is established from the NOx content and/or the CO content of the exhaust gas.

5. Method according to claim 1, characterised in that, when establishing the mean value of the temperature of the hot gases in the overflow channel, an adjustable period of time at the beginning and at the end of each combustion time involved in the establishment is not taken into consideration.

6. Method according to claim 1, characterised in that the establishment of the mean value of the minimum temperatures of the hot gases in the overflow channel is carried out by means of an adjustable number of kiln cycles.

7. Method according to claim 1, characterised in that the establishment of the mean value of the temperature of the hot gases in the overflow channel is carried out by means of an adjustable number of kiln cycles.

8. Method according to claim 1, characterised in that in the method step a) and/or b) the sliding average is established.

9. Method according to claim 1, characterised in that the quantity of combustion air to be supplied is increased when the established difference is too great with respect to the adjustable desired value and the quantity of combustion air to be supplied is decreased when the established difference is too small with respect to the adjustable desired value.

10. Method according to claim 1, characterised in that the quantity of fuel to be supplied is increased when the temperature of the hot gases in the overflow channel is too low and the quantity of fuel to be supplied is reduced when the temperature of the hot gases in the overflow channel is too high.

11. Method according to claim 1, characterised in that, for the mean temperature of the hot gases in the overflow channel, a desired value is adjusted in accordance with the throughput of the kiln and/or the grain size of the material to be burnt, which desired value is used for the adjustment of the quantity of fuel and/or the adjustment of the quantity of combustion air.

\* \* \* \* \*